(12) United States Patent
Li et al.

(10) Patent No.: US 10,909,024 B2
(45) Date of Patent: Feb. 2, 2021

(54) SYSTEM AND METHOD FOR TESTING ELECTRONIC VISUAL USER INTERFACE OUTPUTS

(71) Applicant: Think Research Corporation, Toronto (CA)

(72) Inventors: Ji Ping Li, Toronto (CA); Benjamin Thomas Hare, Toronto (CA)

(73) Assignee: Think Research Corporation, Toronto (CA)

( * ) Notice: Subject to any disclaimer, the term of this patent is extended or adjusted under 35 U.S.C. 154(b) by 0 days.

(21) Appl. No.: 15/957,296

(22) Filed: Apr. 19, 2018

(65) Prior Publication Data
US 2019/0324890 A1    Oct. 24, 2019

(51) Int. Cl.
*G06F 9/44*    (2018.01)
*G06F 11/36*   (2006.01)
(Continued)

(52) U.S. Cl.
CPC ............ *G06F 11/3664* (2013.01); *G06F 8/38* (2013.01); *G06K 9/42* (2013.01); *G06K 9/6202* (2013.01)

(58) Field of Classification Search
CPC ............................................. G06F 11/36–3696
(Continued)

(56) References Cited

U.S. PATENT DOCUMENTS 6,272,244 B1 * 8/2001 Takahashi ............ G06K 9/3258
382/190

7,805,003 B1 * 9/2010 Cohen ................ G06K 9/00463
382/103

(Continued)

OTHER PUBLICATIONS

Mahajan et al. "Using Visual Symptoms for Debugging Presentation Failures in Web Applications", 2016, 2016 IEEE International Conference on Software Testing, Verification and Validation.*

(Continued)

*Primary Examiner* — Jue Louie
(74) *Attorney, Agent, or Firm* — Own Innovation; James W. Hinton

(57) ABSTRACT

A system and method are provided for testing electronic visual user interface outputs. The method includes obtaining a baseline set of one or more screen shots of a user interface, the user interface comprising one or more elements; generating an updated set of one or more screen shots of the user interface, the updated set comprising one or more changes to the user Interface; comparing the baseline set to the updated set to generate a differential set of one or more images illustrating differences in how at least one of the user interface elements is rendered. The comparing includes, for each screen shot: identifying coordinates of edges of a content portion of interest relative to an entire content captured in that screen shot; cropping the content portion using the coordinates from the baseline and updated versions of the entire content captured in that screen shot to obtain content portions of a same size for comparison; and performing a spatial unit-by-unit comparison of the same size cropped content portions to generate a differential image for that screen shot. The method also includes displaying the differential set of one or more images; and receiving an input validating the one or more changes to the user interface, or rejecting the one or more changes to the user interface.

9 Claims, 23 Drawing Sheets

(51) Int. Cl.
*G06F 8/38* (2018.01)
*G06K 9/42* (2006.01)
*G06K 9/62* (2006.01)

(58) Field of Classification Search
USPC .................................................. 717/124–135
See application file for complete search history.

(56) References Cited

U.S. PATENT DOCUMENTS

| | | | | |
|---|---|---|---|---|
| 9,164,874 | B1* | 10/2015 | Tomay | G06F 11/366 |
| 9,213,625 | B1* | 12/2015 | Schrage | G06F 11/3688 |
| 9,262,396 | B1* | 2/2016 | Rodriguez Valadez | |
| | | | | G06F 40/194 |
| 10,613,971 | B1* | 4/2020 | Vasikarla | G06F 11/3692 |
| 2006/0153447 | A1* | 7/2006 | Ouchi | G06K 9/4642 |
| | | | | 382/173 |
| 2011/0231823 | A1* | 9/2011 | Fryc | G06F 11/3688 |
| | | | | 717/125 |
| 2011/0289489 | A1* | 11/2011 | Kumar | G06F 11/3664 |
| | | | | 717/135 |
| 2013/0287305 | A1* | 10/2013 | Dhanda | G06F 17/3089 |
| | | | | 382/218 |
| 2014/0075344 | A1* | 3/2014 | Bentrup | G06F 11/323 |
| | | | | 715/760 |
| 2015/0347284 | A1* | 12/2015 | Hey | G06F 11/3692 |
| | | | | 717/125 |
| 2016/0147641 | A1* | 5/2016 | Malla | G06F 11/3664 |
| | | | | 717/125 |
| 2016/0373829 | A1* | 12/2016 | Ramnani | H04N 17/04 |
| 2017/0277374 | A1* | 9/2017 | Ozcan | G06F 3/0484 |
| 2018/0025503 | A1* | 1/2018 | Tsai | G06K 9/00483 |
| | | | | 382/100 |
| 2018/0075298 | A1* | 3/2018 | Kumar | G06K 9/6202 |
| 2018/0107580 | A1* | 4/2018 | Zhang | G06F 11/3604 |
| 2018/0137035 | A1* | 5/2018 | Magre | G06F 11/3692 |
| 2018/0159988 | A1* | 6/2018 | Kashimura | H04N 1/0066 |
| 2018/0174330 | A1* | 6/2018 | Chen | G06T 7/97 |
| 2019/0188122 | A1* | 6/2019 | Gryka | G06F 11/323 |

OTHER PUBLICATIONS https://github.com/donv/capybara-screenshot-diff; retrieved from the Internet Jun. 26, 2018.

* cited by examiner

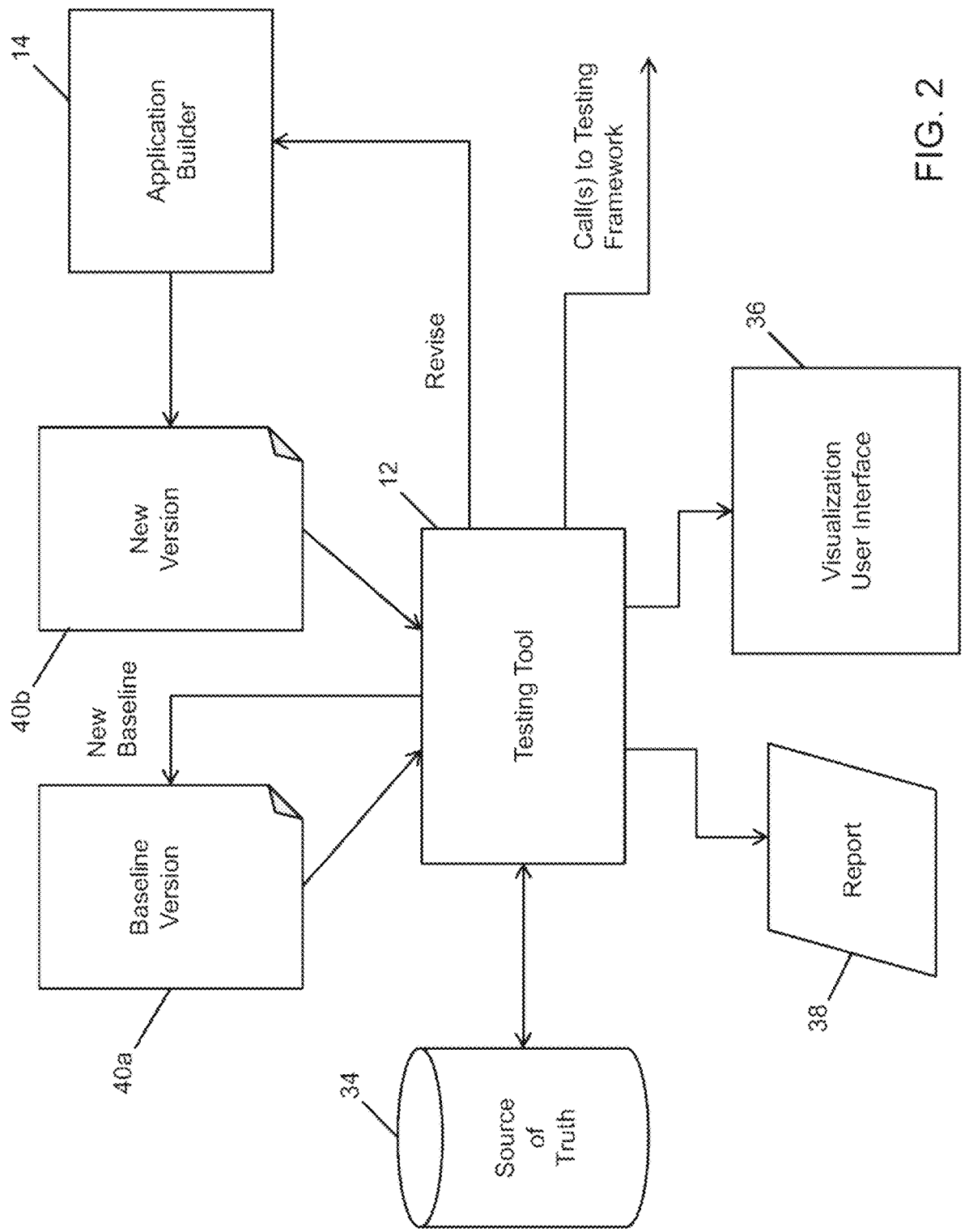

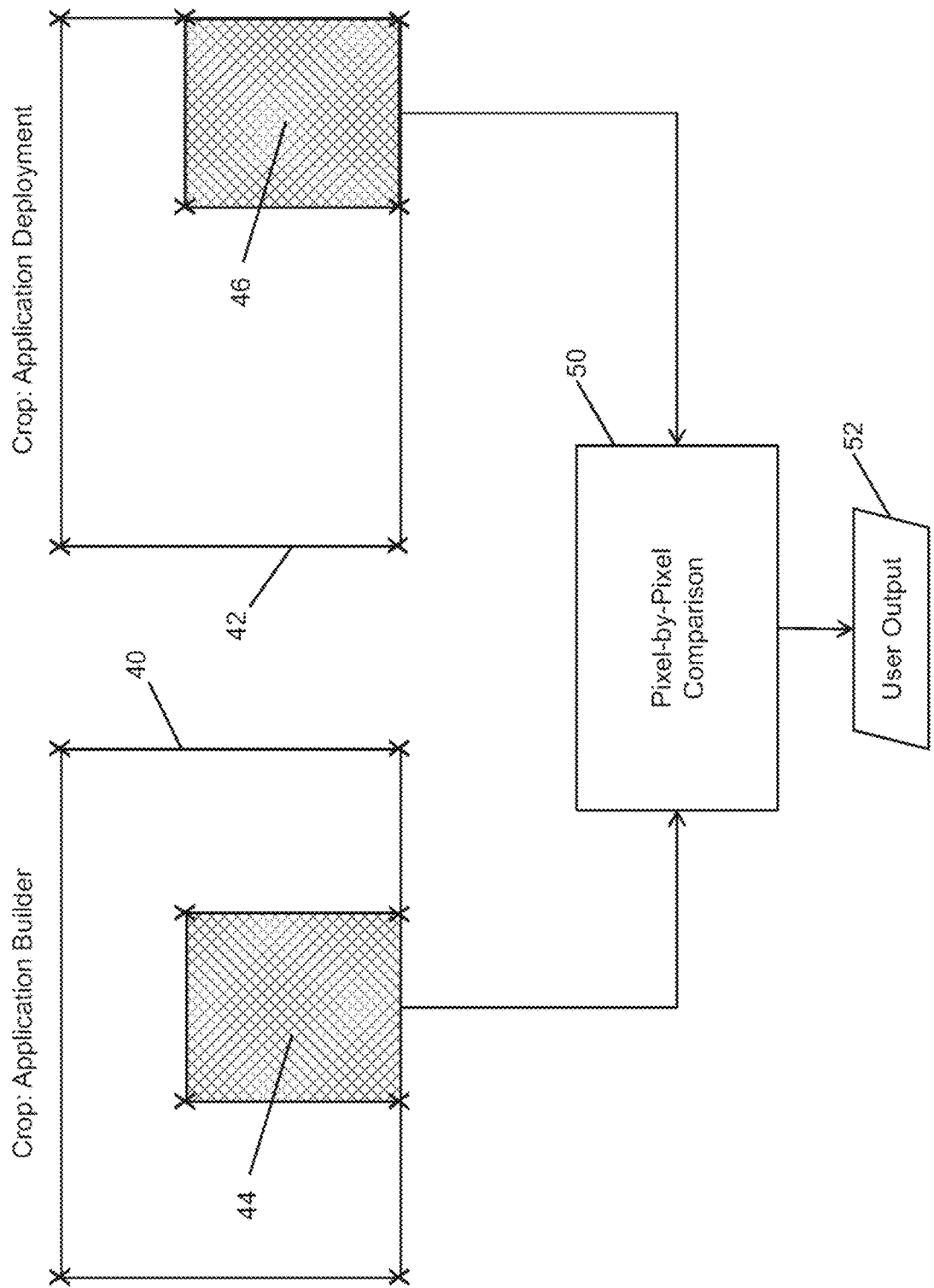

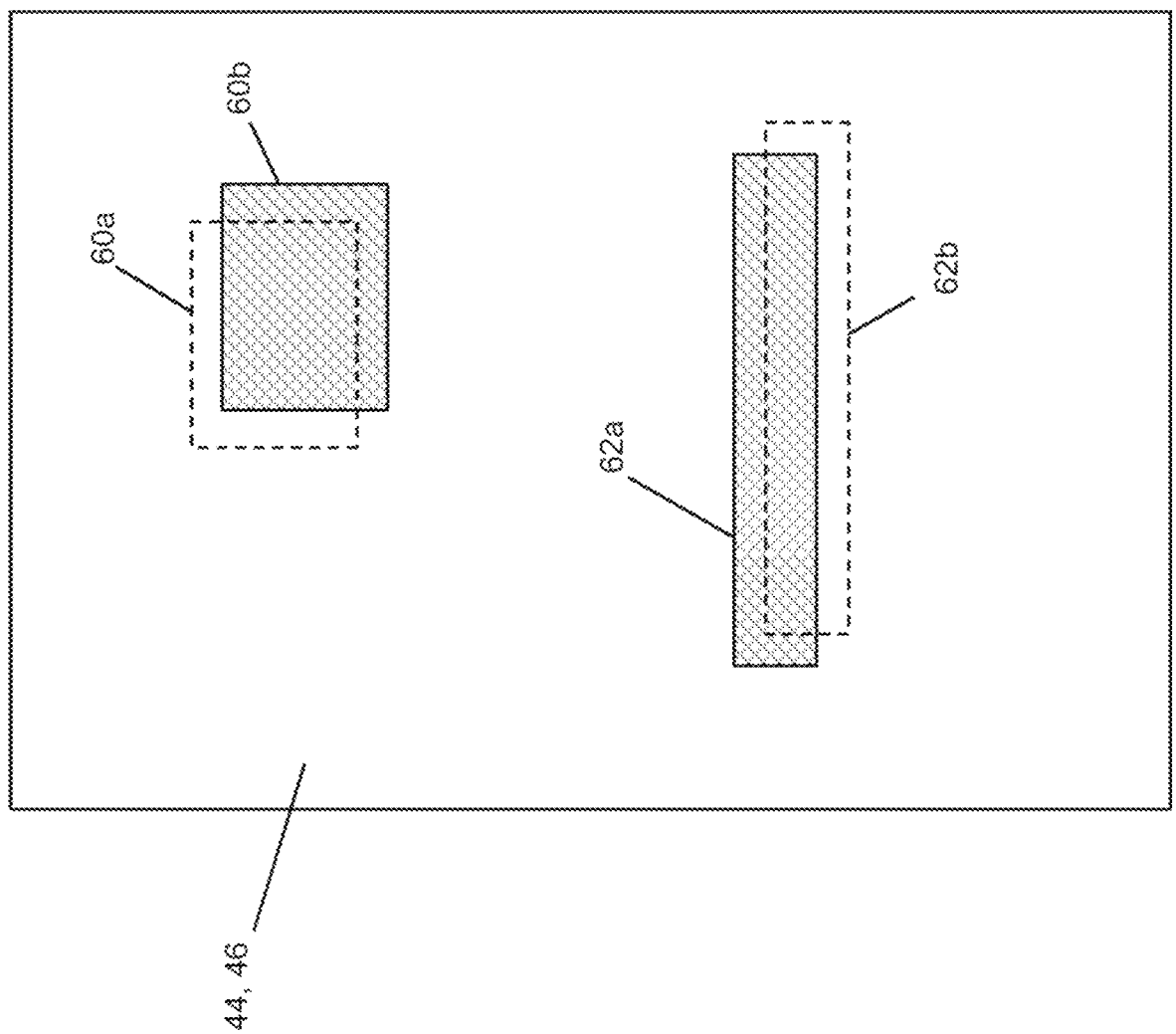

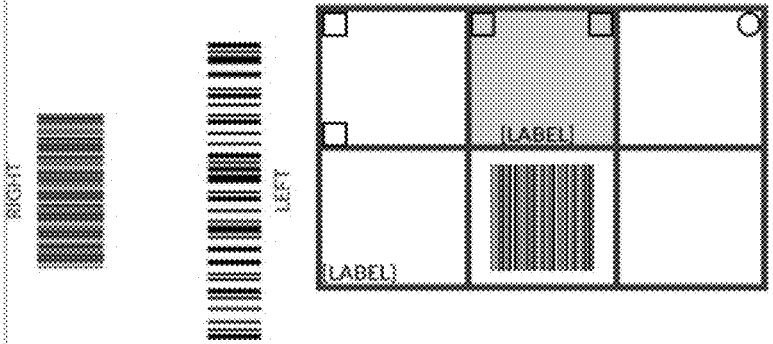
FIG. 10

```
CHROME_STANDALONE_URL = 'http://selenium:4444/wd/hub'.freeze capabilities = Selenium::WebDriver::Remote::Capabilities.chrome
capabilities['chromeOptions'] = {
  'args' => ['--start-maximized']
}
remote_chrome_options = {
  browser: :remote,
  url: CHROME_STANDALONE_URL,
  desired_capabilities: capabilities
}

Capybara.register_driver :remote_chrome do |app|
  Capybara::Selenium::Driver.new(app, remote_chrome_options)
```

FIG. 16

```
require 'shrine'
require 'shrine/storage/s3' s3_config = YAML.load_file(Rails.root.join('config', 'kasper_cloud_storage.yml')) if Rails.env.test? || Rails.env.development?

s3_options = {
  access_key_id: s3_config[Rails.env]["access_key_id"],
  secret_access_key: s3_config[Rails.env]["secret_access_key"],
  bucket: s3_config[Rails.env]["bucket"],
  endpoint: s3_config[Rails.env]["endpoint"],
  region: s3_config[Rails.env]["region"],
  signature_version: 's3',
  force_path_style: true
}

Shrine.storages = {
  cache: Shrine::Storage::S3.new(prefix: "cache", **s3_options),
  store: Shrine::Storage::S3.new(prefix: "store", **s3_options)
}
```

FIG. 17

```
WebMock.allow_net_connect!
Capybara.current_driver = :remote_chrome
```

```
save_screenshots_to_directory(directory)
  script = "document.getElementsByClassName('draft-document-area')[0].getBoundingClientRect(
  document_offset = @document_editor_page.evaluate_script(script)
  page_index = 0 assert @document_editor_page.paginate_arrow_buttons, count: 2 file_path = pick_file_path(directory, page_index)
  save_document_image(file_path, document_offset)
  @document_editor_page.paginate_arrow_buttons[1][:class].include?('disabled')

select_next_page
  page_index += 1
```

FIG. 21

```
def save_document_image(file_path, document_offset)
  put_message(CREATING_MESSAGE, file_path)
  page.save_screenshot(file_path)
  crop_screenshot(file_path, document_offset)
end
```

SYSTEM AND METHOD FOR TESTING ELECTRONIC VISUAL USER INTERFACE OUTPUTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The following relates to systems and methods for testing electronic visual user interface outputs, particularly for comparing changes to the output within the same platform and for comparing how changes appear across multiple platforms.

BACKGROUND

Electronic content is often generated in one computing environment and then deployed in at least one other computing environment, which is increasingly done on multiple platforms. For example, web-based content such as user interface elements rendered within web sites, mobile applications, fillable electronic documents (FEDs) or other documents or forms, may be designed and built within an application that provides a user interface adapted for the creator. Once the mobile web pages, applications, or forms are published, they are consumed in the manner intended for the user, with a different user interface that is adapted for the end-user and the platform in which it is deployed (e.g. a web form on a web site).

Not only do the user interfaces and composition of their elements appear visually differently when being built versus being consumed, the user interfaces are typically used on more than one platform, such as within different web browsers like Chrome, Internet Explorer (IE), Firefox, etc.; and/or on different operating systems. Moreover, these user interfaces, particularly those deployed in an online environment, are often subjected to changes in the content and/or layout of that content, the addition of new features, or the adoption of new web styles. New user interface pages or forms are then released as new software updates, which again may render differently on different platforms, possibly exacerbating the differences.

When being both built and updated, discrepancies between how the user interfaces are interacted with and differences between the platforms on which the user interfaces are used can create visual regressions. For example, a check box could become shifted in one browser or in a new release, separating it from a label or otherwise rendering it differently. Such discrepancies can be caused by even small changes to the layout or content of a user interface.

It is therefore herein desired to address one or more of the above issues.

SUMMARY

In one aspect, there is provided a method for testing electronic visual user interface outputs, comprising: obtaining a baseline set of one or more screen shots of a user interface, the user interface comprising one or more elements; generating an updated set of one or more screen shots of the user interface, the updated set comprising one or more changes to the user interface; comparing the baseline set to the updated set to generate a differential set of one or more images illustrating differences in how at least one of the user interface elements is rendered, the comparing comprising, for each screen shot: identifying coordinates of edges of a content portion of interest relative to an entire content captured in that screen shot; cropping the content portion using the coordinates from the baseline and updated versions of the entire content captured in that screen shot to obtain content portions of a same size for comparison; and performing a spatial unit-by-unit comparison of the same size cropped content portions to generate a differential image for that screen shot; and displaying the differential set of one or more images; and receiving an input validating the one or more changes to the user interface, or rejecting the one or more changes to the user interface.

In another aspect, there is provided a non-transitory computer readable medium comprising instructions for performing the above method.

In yet another aspect, there is provided a system for testing electronic visual user interface outputs, comprising a processor and memory, the memory storing computer executable instructions for: obtaining a baseline set of one or more screen shots of a user interface, the user interface comprising one or more elements; generating an updated set of one or more screen shots of the user interface, the updated set comprising one or more changes to the user interface; comparing the baseline set to the updated set to generate a differential set of one or more images illustrating differences in how at least one of the user interface elements is rendered, the comparing comprising, for each screen shot: identifying coordinates of edges of a content portion of interest relative to an entire content captured in that screen shot; cropping the content portion using the coordinates from the baseline and updated versions of the entire content captured in that screen shot to obtain content portions of a same size for comparison; and performing a spatial unit-by-unit comparison of the same size cropped content portions to generate a differential image for that screen shot; and displaying the differential set of one or more images; and receiving an input validating the one or more changes to the user interface, or rejecting the one or more changes to the user interface.

BRIEF DESCRIPTION OF THE DRAWINGS

Embodiments will now be described with reference to the appended drawings wherein:

FIG. 2 is a flow diagram illustrating a comparison of a new version of a user interface to a baseline version, and providing outputs associated with the comparison;

FIG. 38 is a schematic illustration of pixelated content shown in different resolutions;

FIG. 4 is a graphical illustration of changes made to content layout in a user interface;

FIG. 5 is a screen shot of a first page baseline in a user interface generated as an electronic form;

FIG. 6 is a screen shot of a new first page in the form;

FIG. 7 is a screen shot illustrating a differential between the new and baseline first page in the form;

FIG. 10 is a screen shot illustrating a differential between the new and baseline second page in the form;

FIG. 12 is a screen shot of a new third page in the form;

FIG. 13 is a screen shot illustrating a differential between the new and baseline third page in the form;

FIG. 16 illustrates example source code for creating an active connection with a Selenium Hub software testing framework;

FIG. 17 illustrates example source code for exposing a test instance to access external resources not local to the test environment;

FIG. 18 illustrates example source code for requesting a connection to the Selenium Hub;

FIGS. 19 and 20 illustrate example source code for downloading artifacts from a storage service;

FIG. 21 illustrates example source code for scrolling through a page while invoking a save document image routine;

FIG. 22 illustrates example source code for a save document image function definition;

FIG. 23 illustrates example source code for capturing coordinates of the edges of a form relative to an entire web site to crop the document image from the web site;

FIG. 24 illustrates example source code for comparing two images of the same size; and FIG. 25 illustrates example source code for creating a test report based on results of a comparison.

DETAILED DESCRIPTION

Figure 1A:
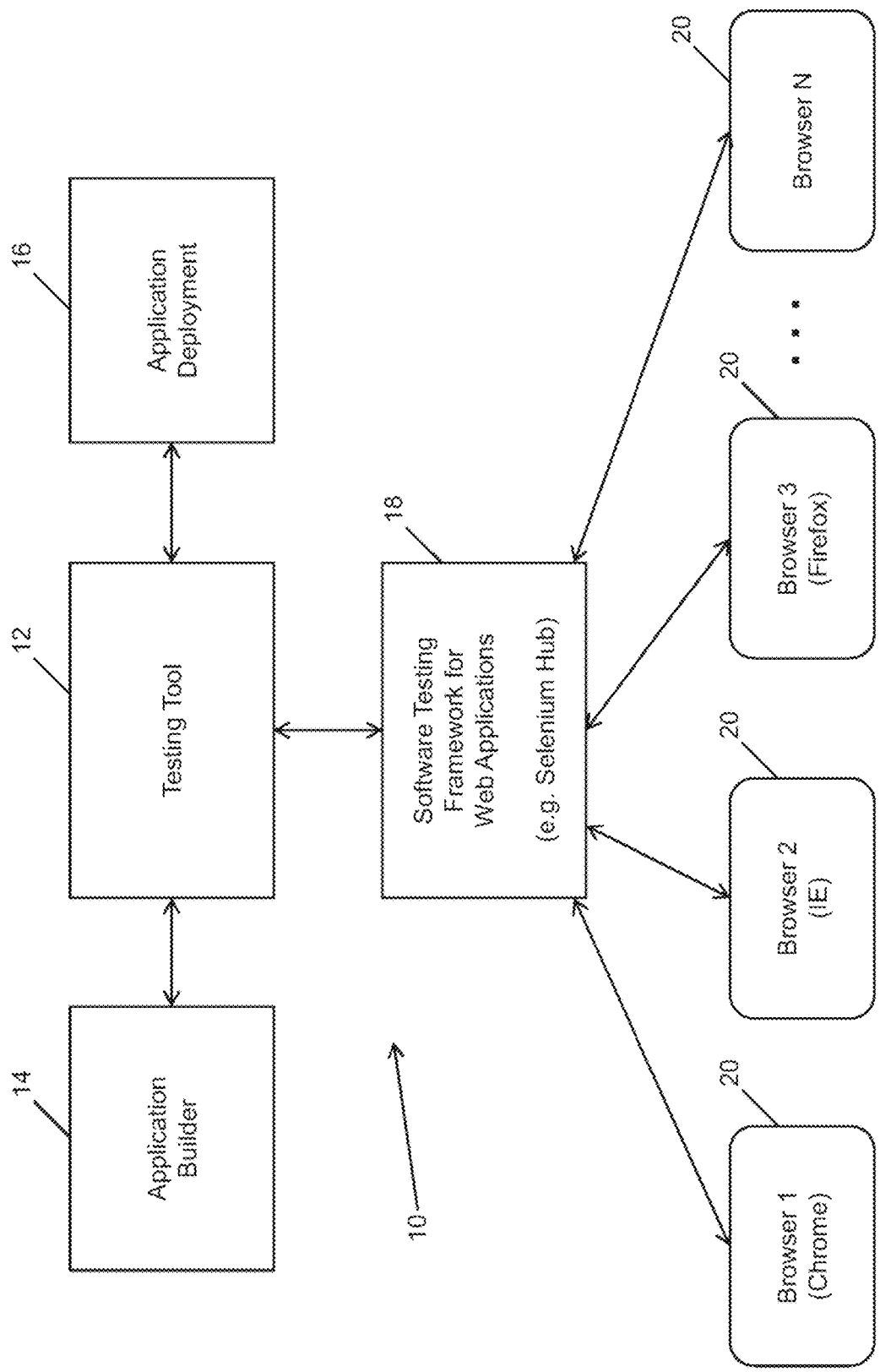
FIG. 1A is a schematic diagram of a computing environment for building, testing, and deploying electronic content to be deployed on multiple platforms.

Turning now to the figures, FIG. 1A provides an example of a computing environment 10 in which a testing tool 12 operates interactively with both an application builder 14 and an application deployment 16 environment. For example, the testing tool 12 can be configured to test electronic content created, and software updates incorporated into content developed using, the application builder 14 (i.e., to test that changes made are as expected). The testing tool 12 can also be configured to test outputs of the electronic content as they appear across multiple computing environments or platforms (i.e. to test that changes, even if appearing as expected in the application builder 14, render as expected in one or more deployment scenarios). In one implementation, the testing tool 12 may be used to test web based content such as FEDs or other documents or forms that can be deployed and consumed within multiple web browser types. One example of an application builder 14 is described in co-pending U.S. patent application Ser. No. 15/809,411 filed on Nov. 10, 2017, and entitled "System and Method for Designing and Editing Computerized Electronic Data-Entry Forms", the contents of which are hereby incorporated by reference. However, it will be appreciated that the principles discussed herein equally apply to any computing environment in which electronic user interface content is designed in one application, and consumed in at least one other environment wherein visual differences can occur due to the different environments in which the content is consumed and/or due to changes/updates made to the content (e.g., as a planned software update).

In general, the testing tool 12 can be configured to test how changes to the underlying code used to render any user interface affects how the user interface elements or components appear visually, both within an environment in which the user interface is built, and within possibly multiple environments in which the user interface is rendered and consumed by a user. For instance, the testing tool 12 can operate to review and compare outputs of source code compilers used to render native desktop user interfaces, web-based (browser) content, and mobile applications. For example, outputs from a JavaScript engine used to generate web-based content such as forms or websites can be tested. Similarly, a Swift engine used to generate mobile applications can be tested.

Applications/tools such as the application builder 14, which are used to build user interfaces generated as forms and the like, often include a user interface with ease-of-creation in mind, similar to a word processing application. For example, a content "page" may be provided with a number of tools arranged about the page in order to facilitate the creation of the content to be populated within that page. In contrast, completed or "published" versions of the content, such as in a web version of the user interface, in this example a web form, are then consumed in an entirely different user interface with ease-of-use in mind. For example, a web-based entry form may include the form surrounded by or otherwise augmented with visual aids that guide the user through the form-filling process. It is recognized herein that the discrepancy between how the forms are interacted with, as well as the platforms on which these forms are used (e.g., a web browser), can create a problem in how to ensure or control a consistent look for the content in different environments and across different platforms. It can be appreciated that these discrepancies can also occur when rendering other user interfaces, such as web pages, documents, mobile applications, etc.

Certain tools exist that allow developers to set web targets (i.e. specific elements on a web page) and track visual differences across cascading style sheet (CSS) updates using screenshots. However, these existing tools have been found to lack an ability to address the above-mentioned problem of how to ensure or control a consistent look for the user interface content in different environments and across different platforms.

The testing tool 12 described herein can be deployed to address these problems, by performing comparisons of a particular user interface, page-by-page, from screen shots of the user interface loaded into multiple different platforms such as web browsers, in connection with application builder 14 and application deployment 16 environments. In the examples described herein provided in the context of web-based content, and more specifically for web-based forms such as FEDs, the testing tool 12 interfaces with a software testing framework 18 for web applications, for example, a Selenium Hub, in order to visualize the web content across multiple different browsers 20. Selenium is a portable software-testing framework for web applications that provides a playback tool for authoring tests without the need to learn a test scripting language. Selenium also provides a test domain-specific language to write tests in a number of programming languages, and enables tests to be run against various modern web browsers. In FIG. 1A examples include: a first browser 20 (Browser 1) corresponds to Google Chrome, a second browser 20 (Browser 2) corresponds to Microsoft's Internet Explorer (IE), a third browser 20 (Browser 3) corresponds to Mozilla's Firefox, and any additional available other browsers 20 (up to Browser N by way of example).

By interacting with a software testing framework 18, the testing tool 12 can not only test changes made in the application builder 14 (against a baseline), but also visualize how such changes, even if "passed" within the application builder 14, would appear when deployed in multiple browsers. This enables the testing tool 12 to determine if, for example, CSS updates need to be revised or aborted in order to avoid an adverse output when the content is deployed using one or more of the platforms. For example, a particular CSS update may be acceptable when deployed within a Chrome browser 20, but be unacceptable when deployed within an IE browser 20. For instance, textual content added to one checkbox may create a wrapping issue that causes content to be pushed to a next page in one browser 20 but not another browser 20, creating inconsistencies when using the same forms on different browser platforms.

As is known in the art, CSS is a style sheet language used for describing the presentation of a document written in a mark-up language. For example, CSS is often used to set the visual style of web pages and user interfaces written in HTML, XHTML, or XML documents. New features and web styles that are added to or modified within a form are therefore often written as CSS updates are released as part of a new software update. Any such new features or changes to web styles can be checked using the testing tool 12 in order to detect and address the discrepancies described above.

Figure 1B:
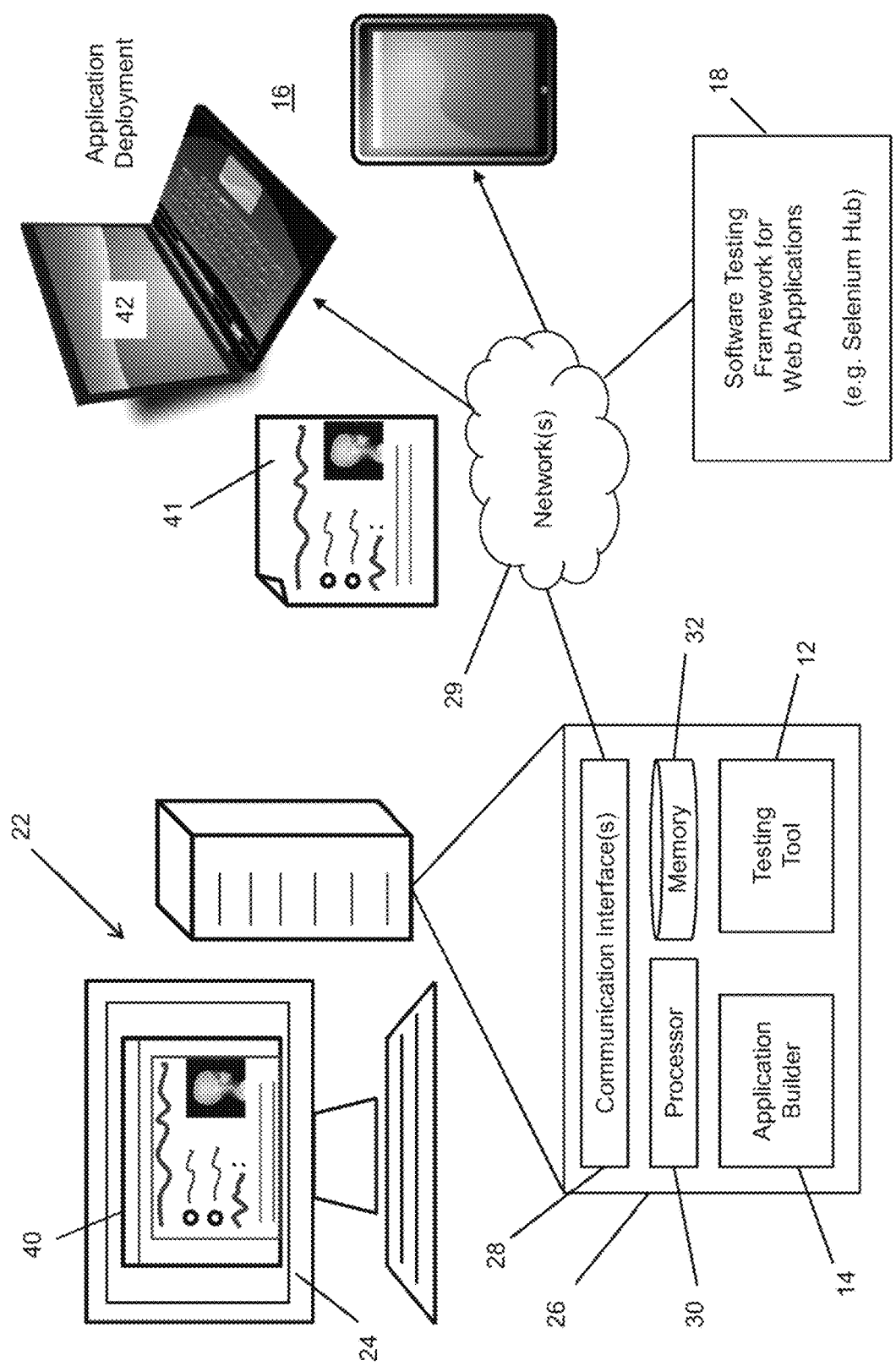
FIG. 1B is a schematic diagram of the computing environment shown in FIG. 1A in an implementation for generating web-based content.

FIG. 1B provides further details of an illustrative example of the computing environment 10 shown in FIG. 1A, for developing web-based content such as forms. It can be appreciated that such a computing environment 10 is also suitable for developing and testing other types of user interfaces according to the principles discussed herein. In this example, a computing device 22 having a monitor or other user interface 24 is provided to enable a developer (user) to create electronic content 40 using an application builder 14. The application builder 14 and testing tool 12 are deployed on a computing platform 26 such as an enterprise server, hosted service, or any other suitable computing architecture that enables content created by the user to be published and deployed in an application deployment 16 environment. The computing platform 26 includes one or more communication interfaces 28 to enable data to be sent and received by the platform 26 and computing device 22, as well as memory 32 for storing data. It can be appreciated that the memory 32 can also be provided by a separate service, such as a cloud-based web storage service (e.g., Amazon Web Services (AWS)). Similarly, both local and remote data storage devices can be used. The communication interface(s) 28 enable the computing platform 26 to access one or more networks 29 such as the internee, an enterprise intranet, etc., using cellular, WiFi or other network connectivity technologies.

A published form 41 is shown in FIG. 1B, which includes the data and web styles capable of being deployed as a web form 42 in the application deployment 16 environment. The application deployment 16 environment can include multiple types of devices consuming the published form 41 using one or more types of web browsers 20 to present the web forms 42 presented to the end-user.

FIG. 2 provides a flow chart illustrating a workflow executed using the testing tool 12. A baseline version 40*a* of the content created using the application builder 14 can be tested against a new version 40*b*. This can be done to determine discrepancies between the new version 40*b* and the baseline version 40*a* within the application builder 14 (to determine if the changes appear as expected), as well as how those changes will affect the outputs in different web browsers 20 (to determine if changes render as expected when consumed). The testing tool 12 can enable the developer to revise the content 40 by re-engaging the application builder 14, or if validated, can have the new version 40*b* applied as the new baseline version 40*a* as explained in greater detail below. The testing tool 12 includes or otherwise has access to a source of truth 34, which can be stored in memory 32 or elsewhere, and contains all of the permutations of the content 40 for testing purposes. These permutations include the various use cases that the type of user interface (e.g. form) can include. For example, if the user interface allows for text boxes, labels, radio buttons, media players, image boxes, etc., the source of truth 34 stores the permutations of how these components can be used. The permutations can include not only component-based permutations, but also layout-based permutations, e.g., to account for margins and how those margins can affect other components, such as by a larger margin "pushing" other components within the user interface.

In the present example, the source of truth 34 is stored as a JSON document, for rendering HTML outputs (i.e. the styles of the user interface) based on a JSON input. It can be appreciated that the data type used to store the source of truth 34 can vary based on the type of output being rendered. That is, the source of truth 34 includes the baseline images which are created using a specific version/permutation of JSON and CSS in this example. The testing tool 12 can render these JSON and CSS combinations in different ways. The testing tool 12 can therefore be used by a developer to ensure that changes in the CSS is what that developer expects, and does not impact more than what is intended on the rendered output. In this implementation JSON is selected based on the data type being used, and contains the different test cases encapsulated within the testing tool 12 (e.g., the elements that can be rendered on a form), and is stored and maintained to provide a backbone for the testing operations. The CSS data represents how the render actually looks, and is ultimately what the testing tool 12 is visualizing for the developer.

The source of truth 34 is updated for layout and content specifications and changes thereto, and can be isolated from the testing tool 12 as illustrated to enable the source of truth 34 to be accessible to different developers running different instances of the testing tool 12, in different locations. The testing tool 12 can also be configured to generate a test report 38 and/or to provide visual renderings showing discrepancies using a visualization user interface 36.

To illustrate a comparison between a baseline and a new version of a user interface, FIG. 3A provides a schematic example of content 40 viewable in the application builder 14 environment that includes a content portion 44 (e.g. form, page of form, etc.) displayed within a larger user interface that may include content creation tools and other related elements. By identifying the coordinates of the corners of the page 44, the area that is ultimately published for consumption in the application deployment 16 environment can be compared against the same content portion 46 as deployed. It can be seen in this illustrative example that the content can be positioned in significantly different areas on the screen and therefore a comparison of the entire web page would not necessarily enable a direct comparison to what was created in the application builder 14. The coordinates (marked by Xs) of the edges of the user interface content portions 44, 46 relative to the entire web site allow the relevant content to be cropped from the web site and a pixel-by-pixel comparison 50 to be executed in order to generate a user output 52. It can be appreciated that the user output 52 can include the test report 38 and/or visualization user interface 36 shown in FIG. 2.

Figure 3B:
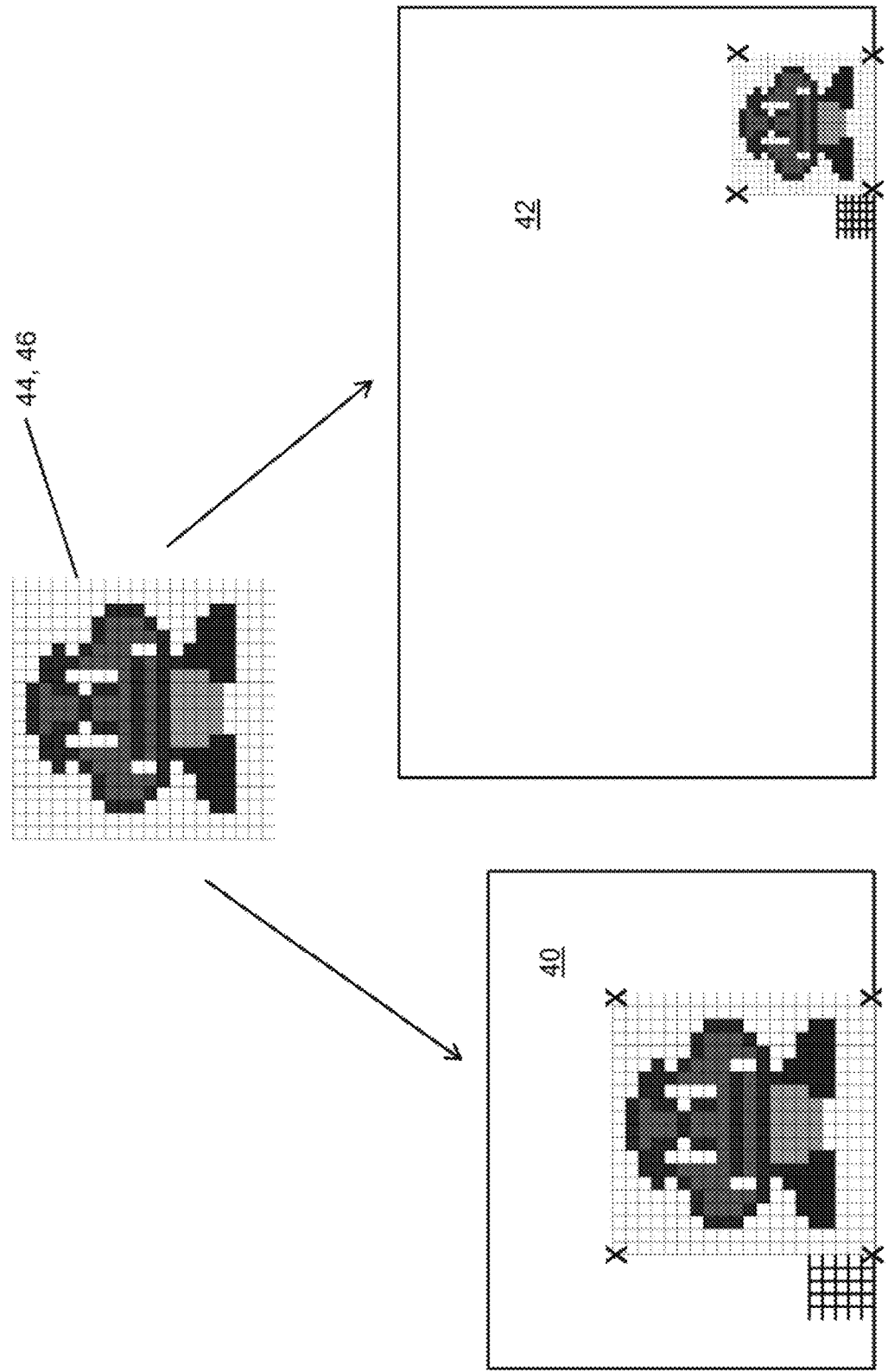
FIG. 3A is a flow diagram illustrating a cropping operation.

As shown in FIG. 3B, the pixel-by-pixel comparison 50 represents more generally the base unit of visualizing and comparing the content unit-by-unit. While the content portions 44, 46 shown in FIG. 3A are illustrated as being the same size, it may be noted that this suggests the same resolution for the displayed content 40, 42. In FIG. 3B, a content portion 44 is shown in a pixelated form to illustrate its incorporation into the content 40, 42 viewable in the application builder 14 and deployment 16 using different resolutions, which ultimately change the scaling and appearance of that content portion 44. That is, the pixel-by-pixel comparison 50 utilizes the base unit of the user interface elements to enable an accurate comparison without distortions created by resolution, screen dimensions, etc.

FIG. 4 provides an illustrative example of a comparison between cropped pages 44, 46 showing visual discrepancies between a first element 60a, 60b and a second element 62a, 62b. While these examples show both horizontal and vertical discrepancies between the elements 60, 62, the elements 60, 62 can also experience only horizontal or only vertical discrepancies, e.g., from changes to margin sizes. It can be appreciated that the testing tool 12 can perform two different types of testing routines, namely one routine that evaluates changes within the application builder 14 (to determine if the changes appear as expected), and one routine that evaluates how changes appear across multiple platforms (e.g., in multiple web browsers 20 to determine if the changed, even if approved, are rendered consistently).

For example, one possibility of a test failure which can produce differential images occurs when an intentional CSS change has been made in the application builder 14, and the differential is used to simply show the developer (user) whether or not the change is expected within the application builder 14, The expected change corresponds to what the CSS was intended to change. For example, if a developer changes the CSS to only target the colour of the document title (the expectation), the testing tool 12 can be used to determine if anything else aside from the colour of the title's colour changed when the CSS is applied. The testing tool 12 can be used to highlight such changes, if they are to occur.

A second possibility of a test failure which can produce differential images, can occur when an intentional CSS change has been made in the application builder 14, wherein the testing tool 12 compares the outputs between the application builder 14 and the application deployment 16, and the comparison shows more (or before unseen) differences than the ones present when running the test within the application builder 14. In this way, the testing tool 12 can confirm if expected changes would provide visual discrepancies when deployed for consumption by a user.

FIGS. 5 to 13 illustrate the second possibility described above, for a sample web form 200 including three pages 200a, 200b, and 200c. In these examples, a testing tool 12 test case that passed on the application builder 14 was found to show differences when the same CSS was applied in the application deployment 16 environment, on a web browser. As such, despite the first test passing within the application builder 14, the second test in the application deployment 16 environment did not. In this scenario, the CSS can be flagged by the testing tool 12 as being potentially detrimental to the functionality of the form. The differential images illustrated in FIGS. 5 to 13 are advantageous as they enable very small differences that are susceptible to being overlooked by the naked eye to be caught. In this way, conformance at a pixel level can be achieved, even across multiple platforms in the application deployment 16 environment. In the case of a document or form, the testing tool 12 can ensure that the document or form looks identical when being filled to the document template that was created in the application builder 14. An example of a small component-level change that could turn into a larger discrepancy includes a small shift caused by an increase to a vertical margin on a specific element. Even with this small shift, if there are multiple instances appearing on the same page or portion of the user interface, the vertical margin increase can cause everything else on the page to be pushed downward, possibly to a next page. When layout and pagination is important, these small discrepancies can be problematic and the testing tool 12 provides a convenient way for developers to identify the problems before deployment or before upgrades are implemented.

Figure 5:
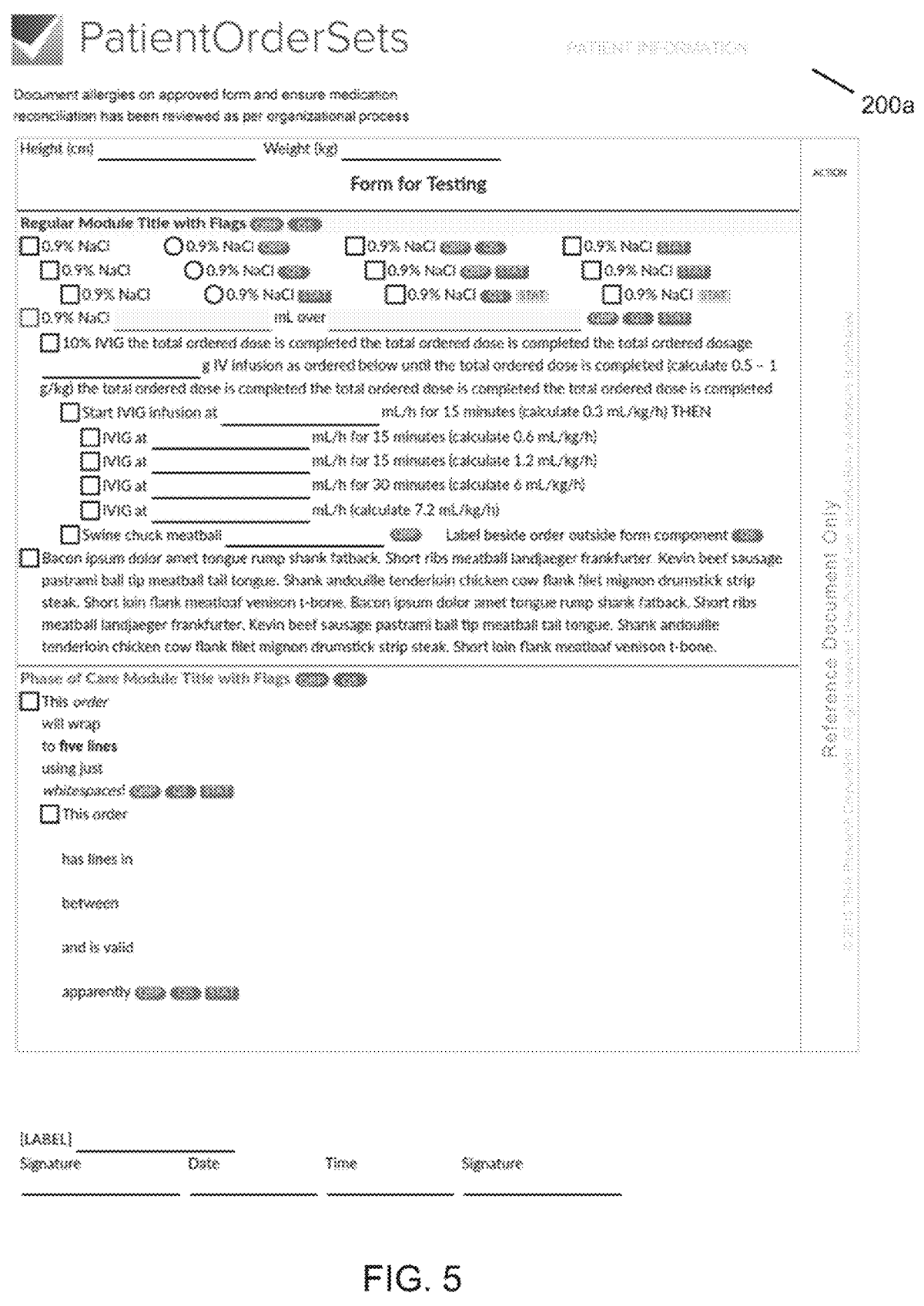
Figure 6:
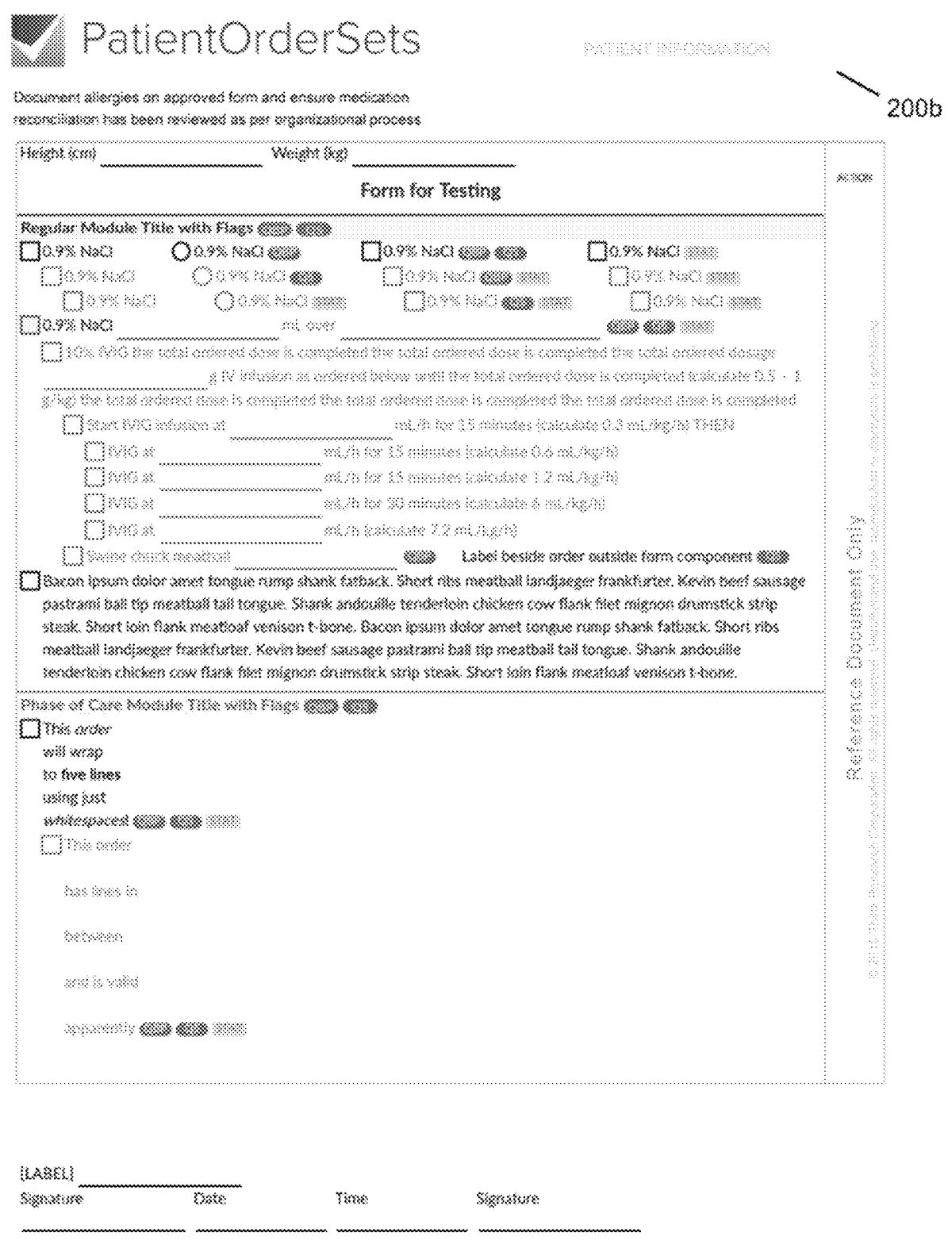
Figure 7:
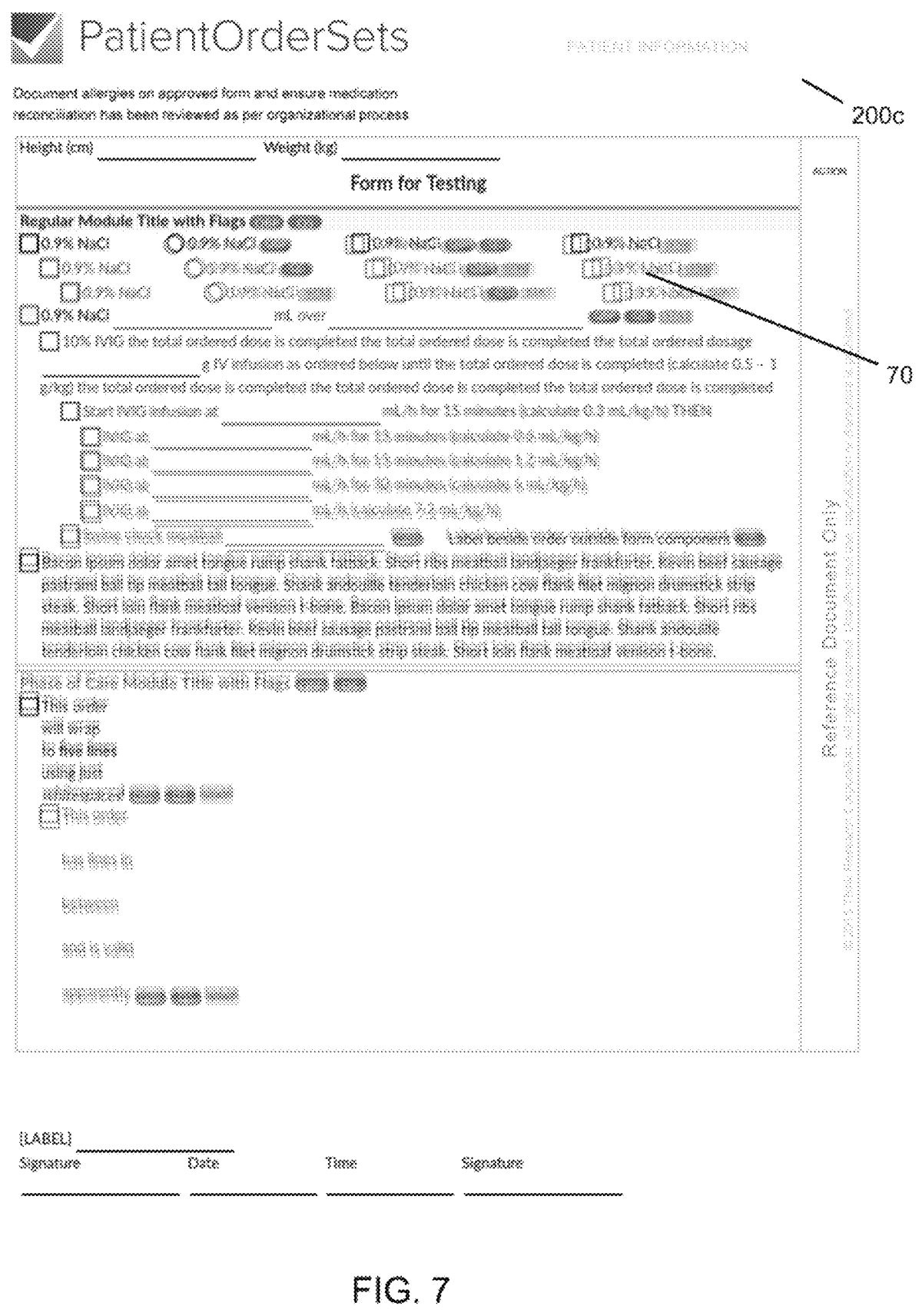

In comparing FIGS. 5, 6, and 7, it can be appreciated from the differential image in FIG. 7 that sibling elements 70 wrapped in a particular way in this form causes a vertical and horizontal shift to those elements 70, with the remaining content experiencing a vertical shift. The differential image in FIG. 7 enables these discrepancies to be observed such that a developer can begin to make assumptions about how these changes likely occurred. For example, the wrapping may have changed, padding added to the top or bottom of an element, etc. When comparing FIGS. 5 and 6, without the differential image of FIG. 7, it would be difficult to observe these discrepancies with the naked eye. In this example, FIG. 5 shows the changed form in the application builder 12, while FIG. 6 shows the rendered output in the application deployment 16 environment, specifically in a browser in this example.

Figure 8:
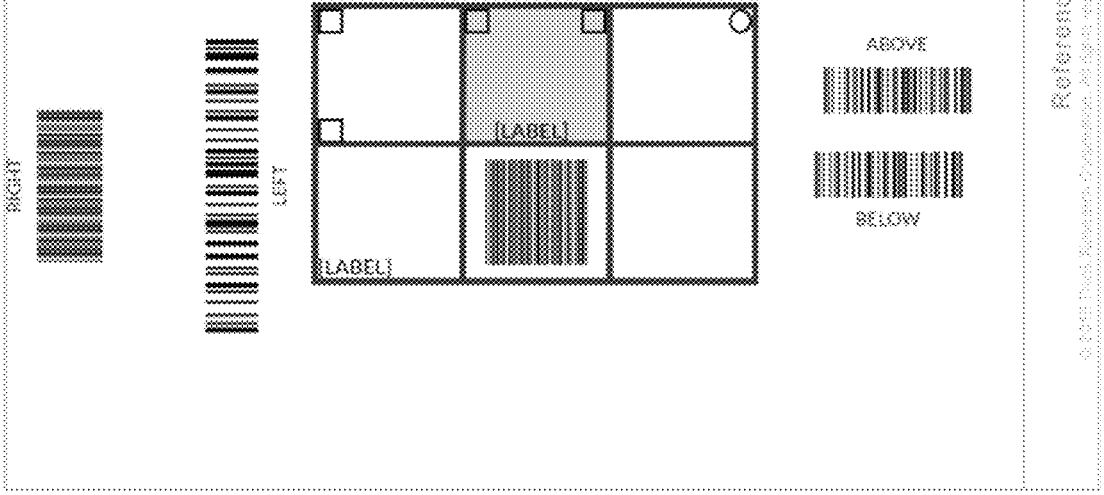
FIG. 8 is a screen shot of a second page baseline in a form.
Figure 9:
FIG. 9 is a screen shot of a new second page in the form.

In comparing FIGS. 8, 9, and 10, it can be appreciated that by changes applied to the view in FIG. 8 are difficult to observe when deployed in FIG. 9, but that the differential image in FIG. 10 identifies a small horizontal shift that is susceptible to being overlooked in a naked eye comparison if only viewing FIGS. 8 and 9.

Figure 11:
FIG. 11 is a screen shot of a third page baseline in a form.
Figure 12:
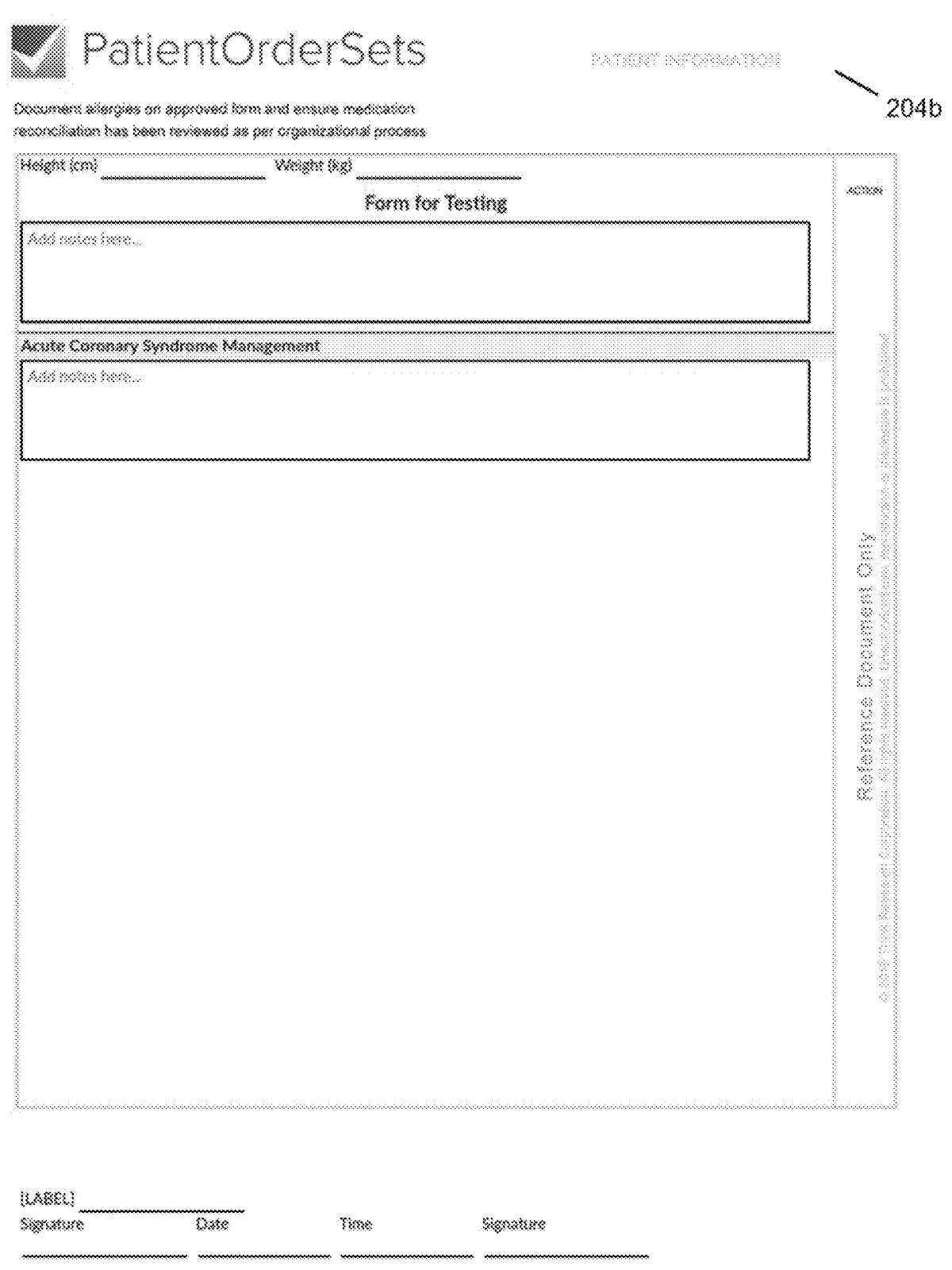
Figure 13:
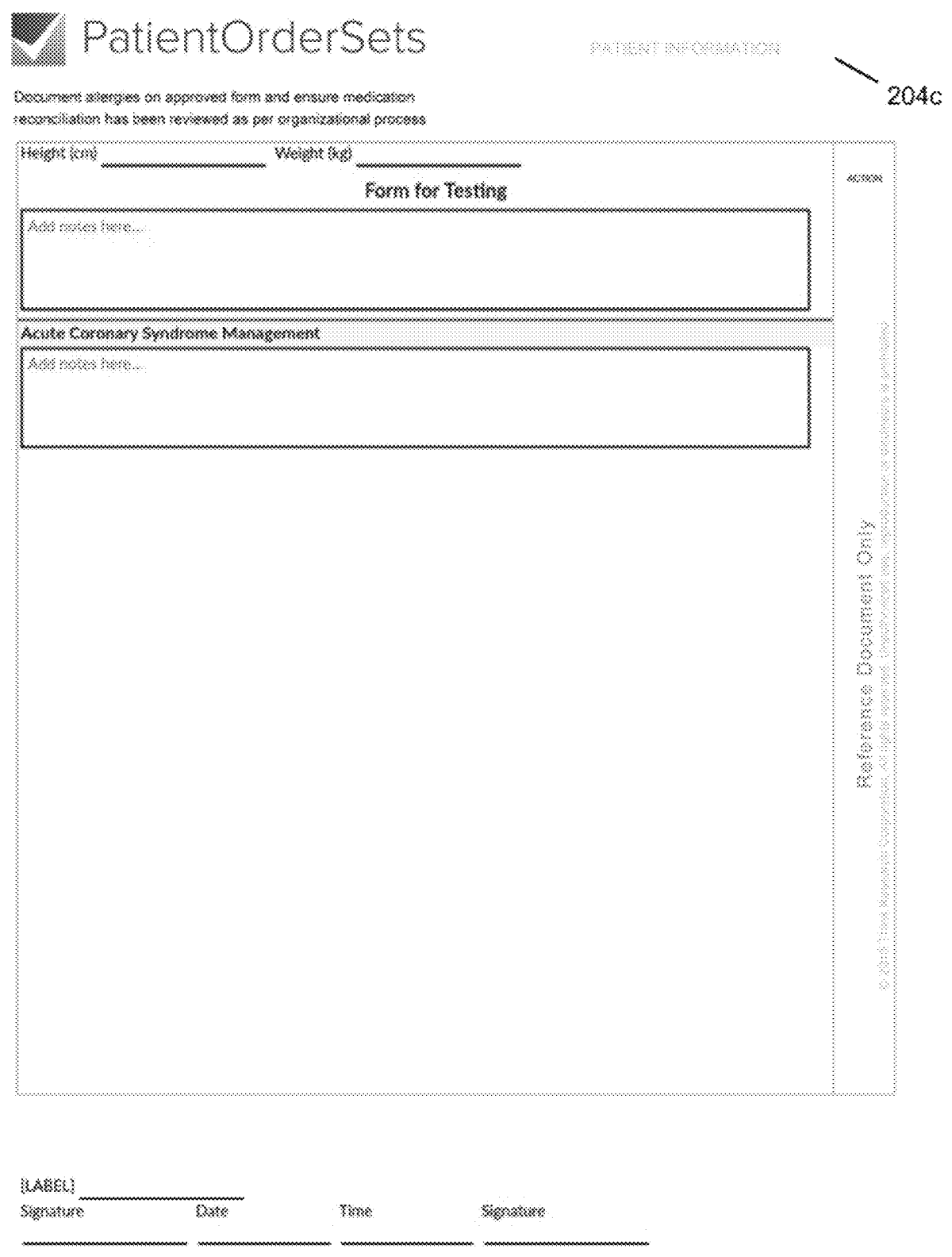

In contrast, when comparing FIGS. 11, 12, and 13, it can be appreciated that by the differential image in FIG. 13 can confirm that the developer's expected changes appear as intended, and the changes can be accepted as a new baseline 40a.

Figure 14:
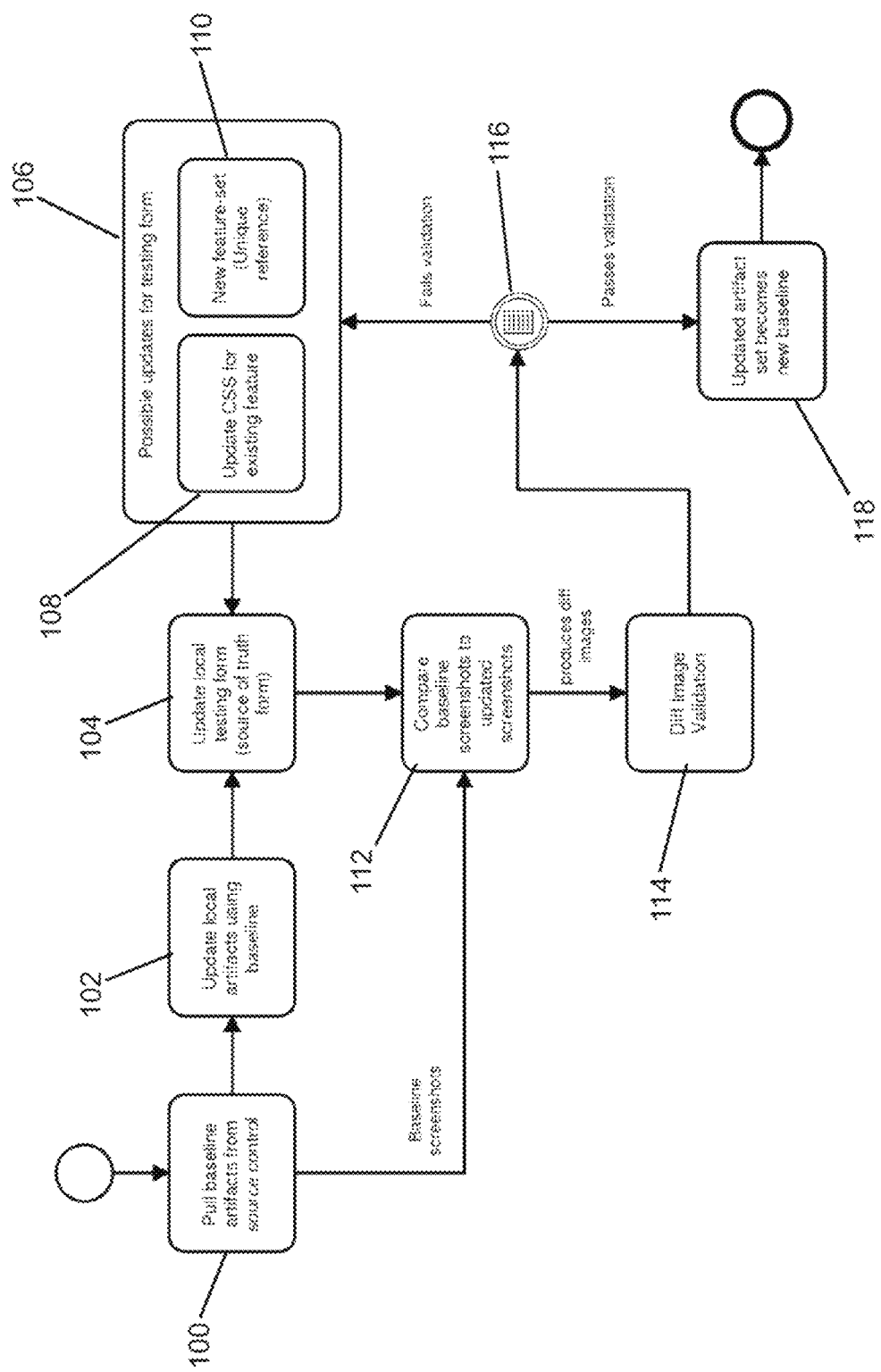
FIG. 14 is a flow diagram illustrating a validation process executed within an application builder environment.

An example workflow for performing a test in connection with the application builder 14 is shown in FIG. 14. At step 100 the testing application 12 pulls the baseline artifacts from the source control (e.g. source of truth 34). The baseline artifacts are used in step 102 to update the local artifacts using the baseline. In the examples described herein, the artifacts associated with the changes can include a JSON change (new test cases, removing deprecated test cases, etc.), or CSS changes (for new feature, bug fix, etc.). The baseline artifacts are also used to obtain baseline screenshots. At step 104, the local testing form (source of truth form) is updated. Step 104 uses the updated local artifacts and possible updates for the testing form generated at step 106. The possible updates for the testing form can include CSS updates for an existing feature at step 108 and/or a new feature set with a unique reference at step 110. The updated local testing form generated at step 104 is then used to compare the baseline screenshots to a set of updated screen shots obtained from the updated local testing form at step 112, with the cropping and pixel-by-pixel comparisons 50 performed on a page-by-page (if appropriate) basis as herein described. The comparison performed at step 112 produces a set of differential images, one per page of the form. The differential images are validated at step 114, with a validation result determined at 116. The validation is performed by the developer to ultimately decide, based on the generated and output differential images, if the changes are the ones he/she expected. If the validation fails at step 116, the developer performing the desired updates being tested at step 106 can be provided with a notification or flag of the failed validation. If the validation passes at step 116, the updated artifact set becomes the new baseline at step 118 and the updated artifact set can be used to determine if the validated changes will still work in the application deployment 16 environment (see FIG. 15 described next). The differential images are also then used to update the source of truth 34. As discussed above, the source of truth 34 is used to store the possible ways that the user interface being tested can exist, more specifically, how the ways that the particular user interfaces (e.g. forms) are intended for use. That is, the source of truth 34 includes a predefined set of features, and the testing tool 12 is meant to be comparing a set of user interface features between a fixed set of changes. For example, the testing tool 12 can be used to determine how a browser based render looks (e.g., a form's DOM object). In that case, between its baseline 40a and its test image 40b, a user interface change has been made within the application builder 14 platform (e.g., CSS). More generally, any user interface feature being rendered on a screen, along with a set of changes that introduces rendering differences on that same screen, can be tested using the testing tool 12.

An example workflow for performing a test in connection with the application deployment 16 environment is shown in FIG. 16. At step 150 the baseline artifacts are pulled from the source control (e.g. source of truth 34). As with the process shown in FIG. 14, the baseline artifacts are used in step 152 to update the local artifacts using the baseline, but in this case the local artifacts in the application deployment 16 environment. The baseline artifacts are also used to obtain baseline screenshots. At step 154, the baseline screen shots from the application builder 14 are compared to screen shots taken with in the application deployment 16 environment. In this case, the screen shots are obtained by requesting one or more specific browsers through the testing framework 18 at step 156. An active connection is made to the Selenium Hub 18 in this example, through an internal test set up.

In one implementation, this connection can be made through a web-based test automation software coupled to or hosting the testing application 12, such as Capybara. Capybara can be used to handle authentication with the Selenium Hub 18 and to automate the testing process through Selenium Hub 18. Test automation software such as Capybara can be used to automate web application testing for behaviour-driven software development, and simulates various aspects of a web browser from the perspective of a real user. Example computer code for making the active connection to a Selenium Hub 18 using Capybara's internal test setup is shown in FIG. 16. In this example, Capybara is also used to expose the test instance to access external resources not local to the test environment. First, an S3 instance, exemplified using Shrine (an open source Ruby library for handling files on S3) is provided in the example code shown in FIG. 17. Next, as shown in the example code illustrated in FIG. 18, an external request is made to connect to the Selenium Hub 18, shown in FIG. 18 using web-mock, an HTTP request library helper for Ruby.

In this example, the form is loaded in both the Chrome browser 20 and the IE browser 20 and screen shots taken of each page of the form to be used in the comparison at step 154. The comparison produces a set of differential images, for each page, in each browser requested. The testing tool 12 then enables a validation of the differential images to be performed by the developer at step 158, with a validation result determined at step 160. If the validation fails at step 160, the developer performing the desired updates can be provided with a notification or flag of the failed validation so that the developer can update the CSS in the application builder 14. If the validation passes at step 160, the updated artifact set from the application builder 14 is confirmed as the new baseline and the updated form can be published as a software update or otherwise be available to be pulled from a web source. The differential images are also then used to update the source of truth 34.

Figure 15:
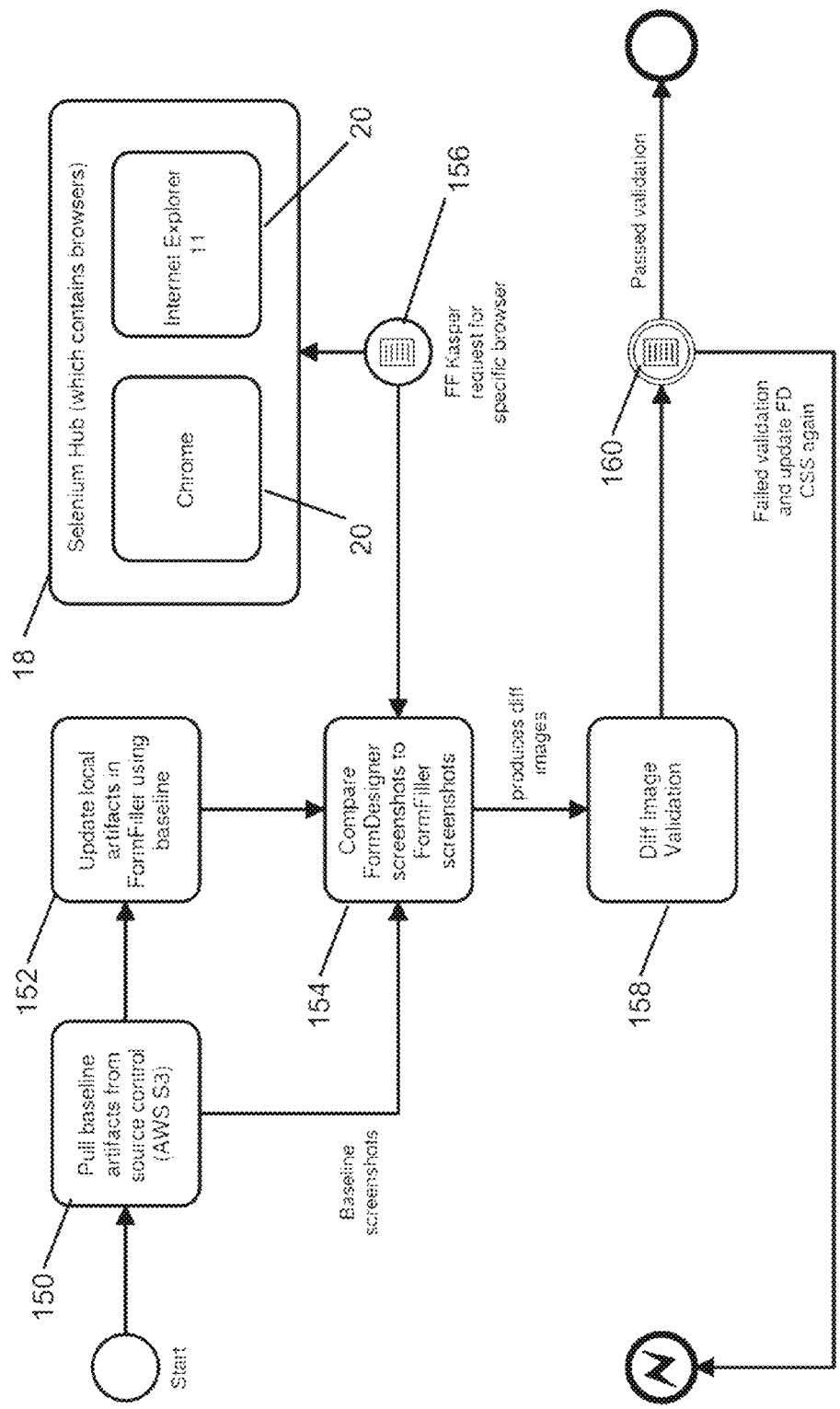
FIG. 15 is a flow diagram illustrating a validation process executed within an application deployment environment.

As can be appreciated from FIGS. 14-15, the testing tool 12 is operable to execute a number of processes. These processes can be performed individually and manually, or more preferably in an automated fashion during the testing process. For example, these tests can be triggered to automatically execute, whenever a new form is created and whenever a change or update to an existing form is attempted.

The testing tool 12 obtains the latest artifacts from the source of truth 34 file store (e.g., AWS). The artifacts can include the CSS bundle for that test version, the form screenshots made using that CSS bundle, or the form screenshot difference images made between the image set and the immediately previous image set. At the end of the testing process, the newly updated artifact set is uploaded to the source of truth 34 file store and archived as a time stamped artifact with metadata to identify the origin of the source of truth artifacts. Example code for downloading artifacts from S3 using Shrine is shown in FIGS. 19 and 20 to illustrate how to set up the testing tool 12 for use.

The testing tool 12 is also operable to perform screenshotting of particular content 40, by navigating through each "page" of the content 40, e.g., pages of a form. Example code for scrolling through a page while invoking a save_document_image command is shown in FIG.

The testing tool 12 is also operable to capture the coordinates of the edges of a form relative to an entire web site page and to crop the document image from the web site. It may be noted that the script on line 2 in FIG. 21 uses a built-in Javascript function called getBoundingClientRect, which can be used to capture the relative coordinates on the corners of an HTML element (i.e. the form as shown in FIG. 3A), as well as the width and height. This information is passed further down in the process within the testing tool 12 for the purposes of the image cropping illustrated in FIG. 3A. Example code for the save_document_image function is shown in FIG. 22. Example code for cropping the screenshot based on these determined coordinates is shown in FIG. 23.

The testing tool 12 is also operable to run a comparison between images of the same size. FIG. 24 provides example code for performing such a comparison between two images using Open3.

Figure 25:
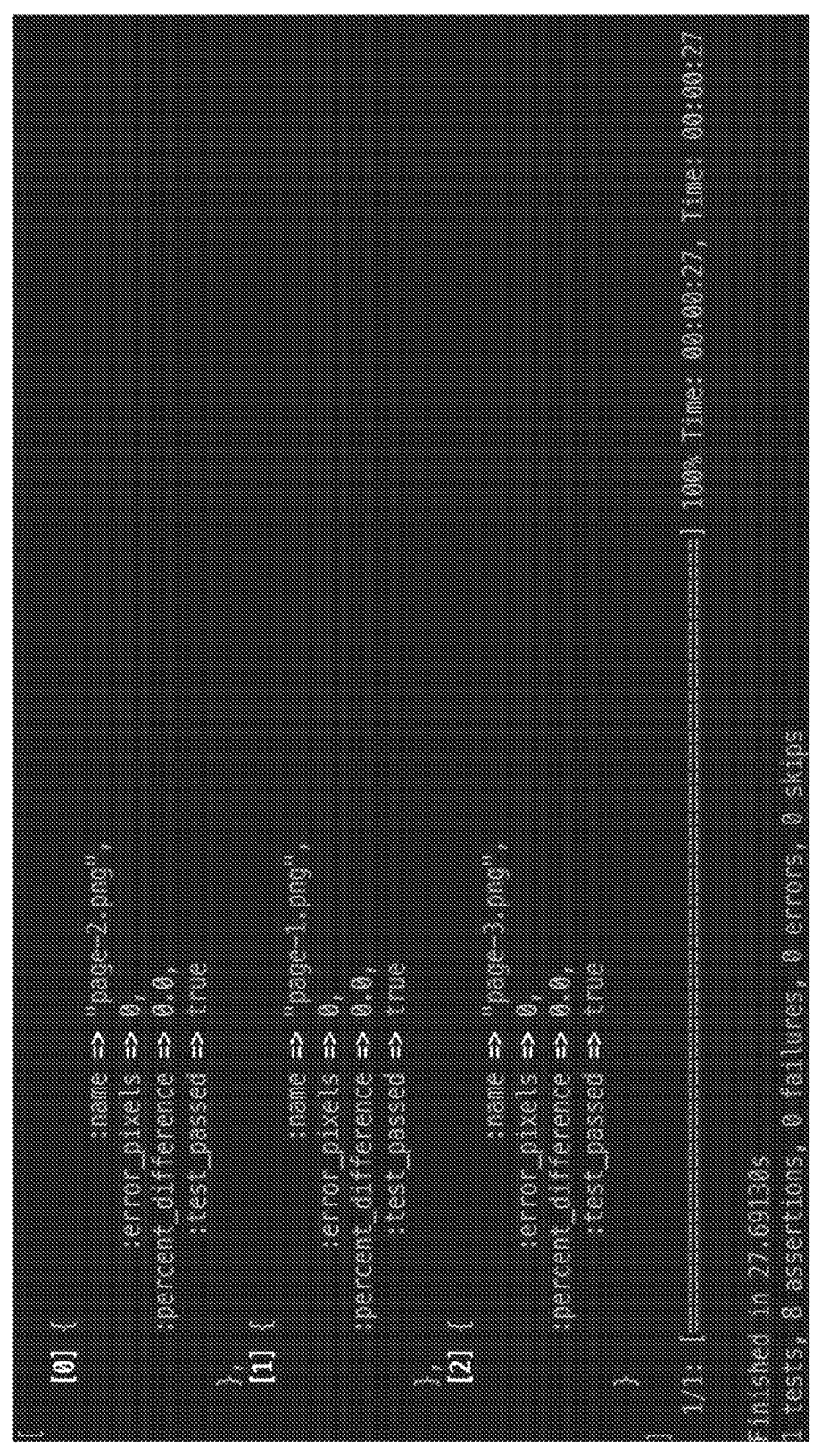

The testing tool 12 is also operable to create a test report 38 based on the result of the comparison. Example code for visualizing the test reporting, using awesome-print, is shown in FIG. 25.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the testing tool 12, any component of or related to the computing environment 10, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of developing and testing a web-based form comprising electronic user interface content as the web-based form is being built, the method comprising:
   generating a possible update for a testing form in an application builder configured for building user interfaces generated as forms, the possible update comprising one or more changes to the electronic user interface content;
   testing the one or more changes to the electronic user interface content made in the application builder, wherein the testing in the application builder automatically executes upon generating the possible update, the testing comprising:
      pulling a first set of baseline artifacts from a source of truth;
      updating a first set of local artifacts in the application builder using the first set of baseline artifacts to generate a first set of updated local artifacts;
      updating a local testing form in the application builder using the first set of updated local artifacts and the possible update for the testing form;
      obtaining a first baseline screenshot using the first set of baseline artifacts;
      obtaining a first updated screenshot from the updated local testing form;
      comparing the first baseline screenshot to the first updated screenshot to generate a first differential image, the comparing comprising:
         for each of the first baseline screen shot and the first updated screen shot, identifying coordinates of edges of a content portion of interest relative to an entire content captured in the respective screen shot;
         cropping the content portion from each of the first baseline screen shot and the first updated screen shot using the coordinates to obtain content portions of a same size for comparison;
         performing a spatial unit-by-unit comparison of the content portion cropped from each of the first baseline screen shot and the first updated screen shot to generate the first differential image;
      displaying the first differential image;
   receiving a first input validating or rejecting the one or more changes to the electronic user interface content for the application builder;
   when the first input rejects the one or more changes, generating a notification of the failed validation;
   when the first input validates the one or more changes, setting the first set of updated local artifacts as a second set of baseline artifacts and updating the source of truth using the first differential image; and
   when the first input validates the one or more changes, testing the one or more changes to the electronic user interface content in an application deployment environment in which the web-based form can be deployed, wherein the testing in the application deployment environment automatically executes upon generating the possible update, the testing comprising:
      pulling the second set of baseline artifacts from the source of truth;
      updating a second set of local artifacts in the application deployment environment using the second set of baseline artifacts to generate a second set of updated local artifacts;
      obtaining a second baseline screenshot using the second set of baseline artifacts;
      obtaining a second updated screenshot taken within the application deployment environment using the second set of updated local artifacts;
      comparing the second baseline screenshot to the second updated screenshot to generate a second differential image, the comparing comprising:
         for each of the second baseline screen shot and the second updated screen shot, identifying coordinates of edges of the content portion of interest relative to an entire content captured in the respective screen shot;
         cropping the content portion from each of the second baseline screen shot and the second updated screen shot using the coordinates to obtain content portions of a same size for comparison;
         performing a spatial unit-by-unit comparison of the content portion cropped from each of the second baseline screen shot and the second updated screen shot to generate the second differential image;
displaying the second differential image;
receiving a second input validating or rejecting the one or more changes to the electronic user interface content for the application deployment environment;
when the second input rejects the one or more changes, generating a notification of the failed validation;
when the second input validates the one or more changes:
confirming the first set of updated local artifacts from the application builder as a new baseline; and
updating the source of truth using the second differential image.

2. The method of claim 1, further comprising generating and outputting a test report.

3. The method of claim 1, wherein the spatial unit-by-unit comparison corresponds to a pixel-by-pixel comparison.

4. The method of claim 1, wherein each screen shot comprises a visual snapshot of a discrete page of the web-based form.

5. A system for developing and testing a web-based form comprising electronic user interface content as the web-based form is being built, the system comprising a processor and memory, the memory storing computer executable instructions for:
generating a possible update for a testing form in an application builder configured for building user interfaces generated as forms, the possible update comprising one or more changes to the electronic user interface content;
testing the one or more changes to the electronic user interface content made in the application builder, wherein the testing in the application builder automatically executes upon generating the possible update, the testing comprising:
pulling a first set of baseline artifacts from a source of truth;
updating a first set of local artifacts in the application builder using the first set of baseline artifacts to generate a first set of updated local artifacts;
updating a local testing form in the application builder using the first set of updated local artifacts and the possible update for the testing form;
obtaining a first baseline screenshot using the first set of baseline artifacts;
obtaining a first updated screenshot from the updated local testing form;
comparing the first baseline screenshot to the first updated screenshot to generate a first differential image, the comparing comprising:
for each of the first baseline screen shot and the first updated screen shot, identifying coordinates of edges of a content portion of interest relative to an entire content captured in the respective screen shot;
cropping the content portion from each of the first baseline screen shot and the first updated screen shot using the coordinates to obtain content portions of a same size for comparison;
performing a spatial unit-by-unit comparison of the content portion cropped from each of the first baseline screen shot and the first updated screen shot to generate the first differential image;
displaying the first differential image;
receiving a first input validating or rejecting the one or more changes to the electronic user interface content for the application builder;
when the first input rejects the one or more changes, generating a notification of the failed validation;
when the first input validates the one or more changes, setting the first set of updated local artifacts as a second set of baseline artifacts and updating the source of truth using the first differential image; and
when the first input validates the one or more changes, testing the one or more changes to the electronic user interface content in an application deployment environment in which the web-based form can be deployed, wherein the testing in the application deployment environment automatically executes upon generating the possible update, the testing comprising:
pulling the second set of baseline artifacts from the source of truth;
updating a second set of local artifacts in the application deployment environment using the second set of baseline artifacts to generate a second set of updated local artifacts;
obtaining a second baseline screenshot using the second set of baseline artifacts;
obtaining a second updated screenshot taken within the application deployment environment using the second set of updated local artifacts;
comparing the second baseline screenshot to the second updated screenshot to generate a second differential image, the comparing comprising:
for each of the second baseline screen shot and the second updated screen shot, identifying coordinates of edges of the content portion of interest relative to an entire content captured in the respective screen shot;
cropping the content portion from each of the second baseline screen shot and the second updated screen shot using the coordinates to obtain content portions of a same size for comparison;
performing a spatial unit-by-unit comparison of the content portion cropped from each of the second baseline screen shot and the second updated screen shot to generate the second differential image;
displaying the second differential image;
receiving a second input validating or rejecting the one or more changes to the electronic user interface content for the application deployment environment;
when the second input rejects the one or more changes, generating a notification of the failed validation;
when the second input validates the one or more changes:
confirming the first set of updated local artifacts from the application builder as a new baseline; and
updating the source of truth using the second differential image.

6. The system of claim 5, further comprising instructions for generating and outputting a test report.

7. The system of claim 5, wherein the spatial unit-by-unit comparison corresponds to a pixel-by-pixel comparison.

8. The system of claim 5, wherein each screen shot comprises a visual snapshot of a discrete page of the web-based form.

9. A non-transitory computer readable medium comprising computer executable instructions for developing and testing a web-based form comprising electronic user interface content as the web-based form is being built, comprising instructions for:

generating a possible update for a testing form in an application builder configured for building user interfaces generated as forms, the possible update comprising one or more changes to the electronic user interface content;

testing the one or more changes to the electronic user interface content made in the application builder, wherein the testing in the application builder automatically executes upon generating the possible update, the testing comprising:

pulling a first set of baseline artifacts from a source of truth;

updating a first set of local artifacts in the application builder using the first set of baseline artifacts to generate a first set of updated local artifacts;

updating a local testing form in the application builder using the first set of updated local artifacts and the possible update for the testing form;

obtaining a first baseline screenshot using the first set of baseline artifacts;

obtaining a first updated screenshot from the updated local testing form;

comparing the first baseline screenshot to the first updated screenshot to generate a first differential image, the comparing comprising:

for each of the first baseline screen shot and the first updated screen shot, identifying coordinates of edges of a content portion of interest relative to an entire content captured in the respective screen shot;

cropping the content portion from each of the first baseline screen shot and the first updated screen shot using the coordinates to obtain content portions of a same size for comparison;

performing a spatial unit-by-unit comparison of the content portion cropped from each of the first baseline screen shot and the first updated screen shot to generate the first differential image;

displaying the first differential image;

receiving a first input validating or rejecting the one or more changes to the electronic user interface content for the application builder;

when the first input rejects the one or more changes, generating a notification of the failed validation;

when the first input validates the one or more changes, setting the first set of updated local artifacts as a second set of baseline artifacts and updating the source of truth using the first differential image; and when the first input validates the one or more changes, testing the one or more changes to the electronic user interface content in an application deployment environment in which the web-based form can be deployed, wherein the testing in the application deployment environment automatically executes upon generating the possible update, the testing comprising:

pulling the second set of baseline artifacts from the source of truth;

updating a second set of local artifacts in the application deployment environment using the second set of baseline artifacts to generate a second set of updated local artifacts;

obtaining a second baseline screenshot using the second set of baseline artifacts;

obtaining a second updated screenshot taken within the application deployment environment using the second set of updated local artifacts;

comparing the second baseline screenshot to the second updated screenshot to generate a second differential image, the comparing comprising:

for each of the second baseline screen shot and the second updated screen shot, identifying coordinates of edges of the content portion of interest relative to an entire content captured in the respective screen shot;

cropping the content portion from each of the second baseline screen shot and the second updated screen shot using the coordinates to obtain content portions of a same size for comparison;

performing a spatial unit-by-unit comparison of the content portion cropped from each of the second baseline screen shot and the second updated screen shot to generate the second differential image;

displaying the second differential image;

receiving a second input validating or rejecting the one or more changes to the electronic user interface content for the application deployment environment;

when the second input rejects the one or more changes, generating a notification of the failed validation;

when the second input validates the one or more changes:

confirming the first set of updated local artifacts from the application builder as a new baseline; and updating the source of truth using the second differential image.

\* \* \* \* \*